United States Patent
Muenter et al.

(10) Patent No.: US 6,781,677 B1
(45) Date of Patent: Aug. 24, 2004

(54) LASER RANGE FINDING APPARATUS

(75) Inventors: Steven E. Muenter, Van Nuys, CA (US); Blair F. Campbell, Malibu, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/355,360

(22) Filed: Jan. 31, 2003

(51) Int. Cl.[7] .................................................. G01C 3/08
(52) U.S. Cl. ...................................... 356/5.05; 356/5.08
(58) Field of Search ............................. 356/5.01, 5.05, 356/5.08, 5.15, 28.5

(56) References Cited

U.S. PATENT DOCUMENTS

| | | | |
|---|---|---|---|
| 3,937,575 A | * | 2/1976 | Bateman |
| 4,097,148 A | | 6/1978 | Fry |
| 4,928,152 A | | 5/1990 | Gerardin |
| 5,267,016 A | * | 11/1993 | Meinzer et al. |
| 5,359,404 A | | 10/1994 | Dunne |
| 5,594,543 A | * | 1/1997 | de Groot et al. |
| 5,638,163 A | | 6/1997 | Nourrcier, Jr. |
| 5,748,295 A | * | 5/1998 | Farmer |
| 5,949,530 A | | 9/1999 | Wetteborn |
| 5,953,109 A | | 9/1999 | Lai et al. |
| 6,057,910 A | | 5/2000 | Dunne |
| 6,233,045 B1 | * | 5/2001 | Suni et al. ............... 356/5.01 |

OTHER PUBLICATIONS

Lin et al., *A Possible Way for Low–Power Short Distance Optical Range Detector Using Regenerative Gain–Switched Laser Diode*, IEEE Laser And Electro–Optics Society 1996 Annual Meeting Conference Proceedings, pp. 188–189, 1996.

* cited by examiner

*Primary Examiner*—Stephen C. Buczinski
(74) *Attorney, Agent, or Firm*—Harness Dickey & Pierce P.L.C.

(57) ABSTRACT

FIG 1 of the drawings has been amended to include arrows 12a and 12b. The word "laser", the arrow symbol underneath the word "laser" and the partial sinusoidal symbol adjacent the word "laser"have all been deleted. In addition, the word "photodetector" deleted and a dashed line circumscribing the photodetector components has been added along with reference numeral 25. Reference numeral 24 has been added to denote the photodiode. Finally, the photodiode symbol associated with oscillator apparatus 12 has been changed to simply indicate a "Gain Cavity" box. The attached "Replacement Sheet(s)"of drawings include changes to FIG. 1. The attached "Replacement Sheet(s), "which include(s) FIG(S.) 1 and 2, replace the original sheet(s) including FIG(S.) 1 and 2.

18 Claims, 4 Drawing Sheets

Pump Power Too Low for
Seeded Oscillation

Pump Power Correct for
Seeded Oscillation

Pump Power Too High for
Seeded Oscillation

LASER RANGE FINDING APPARATUS

BACKGROUND OF THE INVENTION

1. Field of the Invention

The present invention relates to laser range finding systems and more particularly to the detection of return pulses utilizing properties inherent to a laser cavity undergoing relaxation oscillations.

2. Description of the Related Art

Laser range finders operate on the principle of measuring the time of flight of an intense, short duration pulse of energy from the time it is produced by a transmitter assembly to the time the reflected pulse from the downrange target is detected by a receiver assembly. Since the speed of light is a known constant, the time of flight of the pulse can be used to calculate the distance to the downrange target. Laser range finders typically consist of a collection of the following subassemblies: transmitter assembly, receiver assembly and controller assembly.

Presently, many implementations exist for a transmitter assembly to produce the desired high Intensity, short duration pulse of energy such as flashlamp pumping or Q-switching of the laser cavity. Beam forming and directing optics are used to focus the pulse on the downrange target. Characteristics of the transmitted pulse, such as temporal profile, spatial profile and wavelength, are preserved in the reflected pulse and may therefore be used to differentiate the reflected pulse from background or other interfering sources. The components of the transmitter assembly are often expensive, bulky and sensitive to misalignment. It would be desireable to eliminate many of these components while still retaining the functionality of the transmitter assembly.

The function of the receiver assembly is to collect the energy from the reflected pulse and detect its time of arrival. This is typically implemented using beam collecting optics to focus the incoming pulse on a photodetector such as a photomuluplier tube or a semiconductor photodiode. The reflected pulse from the downrange target is greatly attenuated due to such effects as atmospheric absorption and scatter, range to the target, diffuse scattering of the reflected pulse from the target and low reflectivity of the target. The peak intensity of the transmitted pulse must be great enough to insure detection of the attenuated return pulse by the receiver assembly under the most stressing conditions. The receiver assembly must also accommodate a wide dynamic range of reflected pulse intensities due to the fact that the intensity of the short time-of-flight return pulse from nearby targets is greater than the long time-of-flight pulses from distant targets. A desirable feature of the receiver assembly is the ability to increase the sensitivity of the receiver detector as a function of time-of-flight synchronized to the timing of the transmitted pulses.

The receiving assembly must also discriminate the return pulse from background interfering sources. The beam collection optics limits the field of view of the detector to the region illuminated by the transmitting assembly. This requires careful alignment of the receiver optics to the transmitter optics. It is more desirable to use the same optical system for both functions, however, the backscattering and retroreflections of the transmitted pulse from the optics may appear with great intensity at the receiver detector, which may result in saturation of the detector.

To further aid the receiver assembly in discriminating the return pulse, narrow band optical filters are used to reject signals that do not match the wavelength of the transmitted pulse. These filters can be costly and may require precise alignment. It would be desirable if the detector were inherently sensitive to only the same wavelength as the transmitted pulse.

The generation of short optical pulses with long repetition rates using electronic regeneration techniques in laser diodes is disclosed by Hung-Tser Lin and Yao-Huang Kao in their article entitled "A Possible Way for Low-power Short Distance Optical Range Detector Using Regenerative Gain-Switched Laser Diode" from the IEEE Lasers and Electro-Optics Society 1996 Annual Meeting Conference Proceedings. However, the pulse regeneration method described uses electronic means to sense the output pulse and modulate the power to the laser diode to induce oscillations. No direct optical feedback is employed in this method.

U.S. Pat No. 4,928,152, issued to Jean-Pierre Gerardin, discloses an apparatus in which the optical signal issued from a laser cavity is reflected by a target and re-injected Into the same laser cavity using the same collimating and focusing optics. The purpose of this configuration is to produce heterodyne beat signals as the CW laser diode is frequency modulated. This apparatus uses interferometery to determine distance, rather than measurement of the time-of-flight of an optical pulse.

U.S. Pat. No. 5,359,404, issued to Jeremy G. Dunne, discloses a laser rangefinder which determines the time-of-flight of an infrared laser pulse reflected from a downrange target. This apparatus is inherently sensitive to interfering signal sources and therefore requires additional means for the detection and discrimination of the return pulse. A digital logic-operated gate for the "opening"and "closing" of a time window is required in the optical receiver for the purpose of rejecting interfering optical signal sources, such as internal reflections and atmospheric backscatter. Further filtering is provided by a narrow band interference filter tuned to the wavelength of the emitted laser pulse. Additionally, separate collimating and focusing optics are used in the transmitting and receiving portions of the apparatus.

OBJECTS AND SUMMARY OF THE INVENTION

It is a principal object of the present invention to provide the necessary functionality for a laser range finding apparatus while significantly reducing the number of components and subsequent cost and complexity by utilizing Inherent properties of a laser cavity.

It is another object of the invention to generate optical pulses, suitable for the purposes of range finding, by utilizing a laser cavity in a perturbed mode to induce relaxation oscillations.

It is another object of the invention to minimize the number of optical components by utilizing the same beam conditioning and directing optical assembly for both the transmission of the optical pulse and the collection of the return pulse from the downrange target It is another object of the Invention to eliminate the high-gain photodetector amplifier electronics in the receiver assembly by optically amplifying the collected return pulse utilizing the gain medium of the same laser cavity used to produce the outgoing pulse.

The present invention is a laser range finding apparatus. In a broad aspect it includes an optical relaxation oscillator assembly, outcoupling optics, a photodetector and a controller. The optical relaxation oscillator assembly produces relaxation oscillations. The relaxation oscillations are a series of optical pulses having a controllable repetition rate. The outcoupling optics receives the series of optical pulses and redirects a minor portion of the energy of the series of optical pulses. A major portion of the energy of the series of optical pulses is adjusted in accordance with first desired beam propagation parameters. A photodetector receives the minor portion and converts the minor portion to an electrical signal representative of the series of optical pulses. A controller receives the electrical signal and determines the repetition period between the optical pulses. The controller provides a controller output to the optical relaxation oscillator assembly for adjusting the controllable repetition rate of the series of optical pulses produced by the optical relaxation oscillator assembly. During operation, the major portion of the energy of the series of optical pulses is directed to a reflecting target, reflected therefrom, collected by the outcoupling optics, and directed back to the optical relaxation oscillator assembly to stimulate subsequent relaxation oscillations, thus locking the period of the relaxations oscillations to the time of flight of the roundtrip path between the laser finding apparatus and the reflecting target.

The present invention eliminates the need for variable gain control of the receiving assembly detector by utilizing the Inherent time varying gain property of the relaxation oscillator. The relaxation oscillator provides variable optical amplification as a function of time, synchronized to the time of transmission of the outgoing optical pulse. The amplification is at a minimum after the generation and transmission of the outgoing pulse, thereby preventing amplification and detection of backscatter and retro reflections from the optical assembly. The optical amplification monotonically increases, thereby providing higher gain for typically less Intense, longer time-off-light return pulses from more distant targets.

The present invention eliminates the need for optical filters by utilizing the inherent narrow bandwidth amplification of the laser cavity to amplify only return pulses with a wavelength that is mode matched with the laser cavity. Since the same laser cavity is used for generation of the outgoing pulse, the return pulse is inherently mode matched with the laser cavity. This extremely narrow band amplification effectively filters out all out-of-band background noise and interference sources.

The present invention eliminates the requirement for a large dynamic range of the photodetector amplifier used to detect the return pulses. The return optical pulses are use to seed the subsequent relaxation oscillation in the laser cavity. The intensity of the optical pulse produced by the relaxation oscillation is independent of the intensity of the seed pulse. The photodetector detects the seeded pulses which are of uniform intensity.

Other objects, advantages and novel features will become apparent from the following detailed description of the invention when considered in conjunction with the accompanying drawings.

BRIEF DESCRIPTION OF THE DRAWING

The present invention will become more fully understood from the detailed description and the accompanying drawings, wherein:

FIG. 3a illustrates population inversion as a function of time. FIG. 3b illustrates laser output as a function of time. FIG. 3c illustrates target return as a function of time.

FIG. 4a illustrates population inversion as a function of time. FIG. 4b illustrates laser output as a function of time. FIG. 4c illustrates target return as a function of time.

FIG. 5a illustrates population inversion as a function of time. FIG. 5b illustrates laser output as a function of time. FIG. 5c illustrates target return as a function of time.

DETAILED DESCRIPTION OF THE INVENTION

Figure 1:
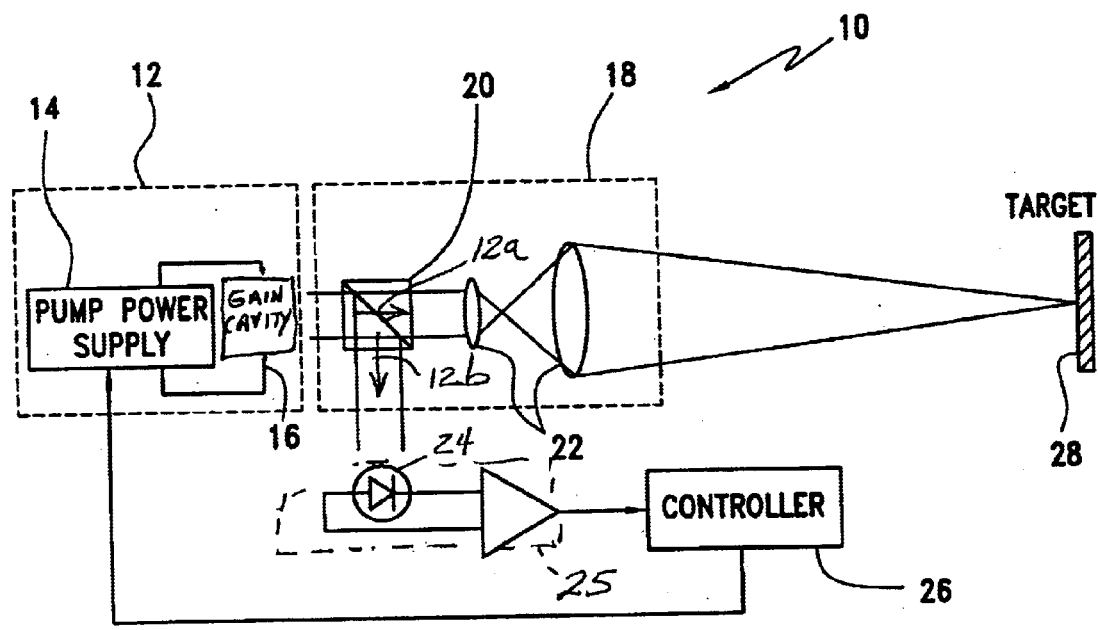
FIG. 1 is a schematic representation of the laser range finding apparatus of the present invention.

Referring now to the drawings and the characters of reference marked thereon, FIG. 1 illustrates a preferred embodiment of the laser finding apparatus of the present invention, designated generally as 10. The laser finding apparatus 10 includes an optical relaxation oscillator assembly, designated generally as 12, for producing relaxation oscillations. The relaxation oscillations produced are a series of optical pulses at a controllable repetition rate. The optical relaxation oscillator assembly 12 preferably includes a power source 14 and a laser gain cavity 16 operably associated with the power source 14 for producing the relaxation oscillations. The power source 14 pumps a gain medium of the optical relaxation oscillator assembly 12, providing a means for controlling a timing profile of a population inversion within the gain medium. The laser gain cavity 16 operates in a perturbed mode to induce relaxation oscillations at a repetition rate influenced by the power source 14. The power source 14 can be, for example, a controllable electric source, an optical source or radio frequency (RF) source.

Outcoupling optics 18 receives the series of optical pulses from the optical relaxation oscillator assembly 12 and redirects a minor portion of the energy of the series of optical pulses, as represented by arrow 12b. A major portion of the energy of the series of optical pulses, represented by arrow 12a, is adjusted in accordance with first desired beam propagation parameters.

The outcoupling optics 18 preferably includes a beamsplilter 20 for redirecting the minor portion of the energy and beam directing optics 22 for providing the adjustment of the major portion. The first desired beam propagation parameters may include, for example, collimation and focus.

The outcoupling optics 18 allows for the injection of photons from optical signals reflected by the target to induce the relaxation oscillations.

A photodetector 24 of a photodetector subsystem 25 receives the minor portion of energy and converts that minor portion to an electrical signal representative of the series of optical pulses. The photodetector 24 used may be, for example, a semiconductor photodiode or a phototube.

A controller 26 receives the electrical signal from the photodetector 24 and determines the repetition period between the optical pulses. The controller 26 provides a controller output to the optical relaxation oscillator assembly 12 for adjusting the controllable repetition rate of the series of optical pulses produced by the optical relaxation oscillator assembly 12. The controller 26 includes means for determining when the repetition period results from a locking of the oscillator assembly 12 because of seed pulses received back into the laser gain cavity 16. Additionally, it includes means for measuring the repetition period. The controller 26 may be, for example, a microcontroller, FPGA (field programmable gate array) or an ASIC (application specific integrated circuit) along with a precision timebase such as a crystal oscillator.

Figure 2:
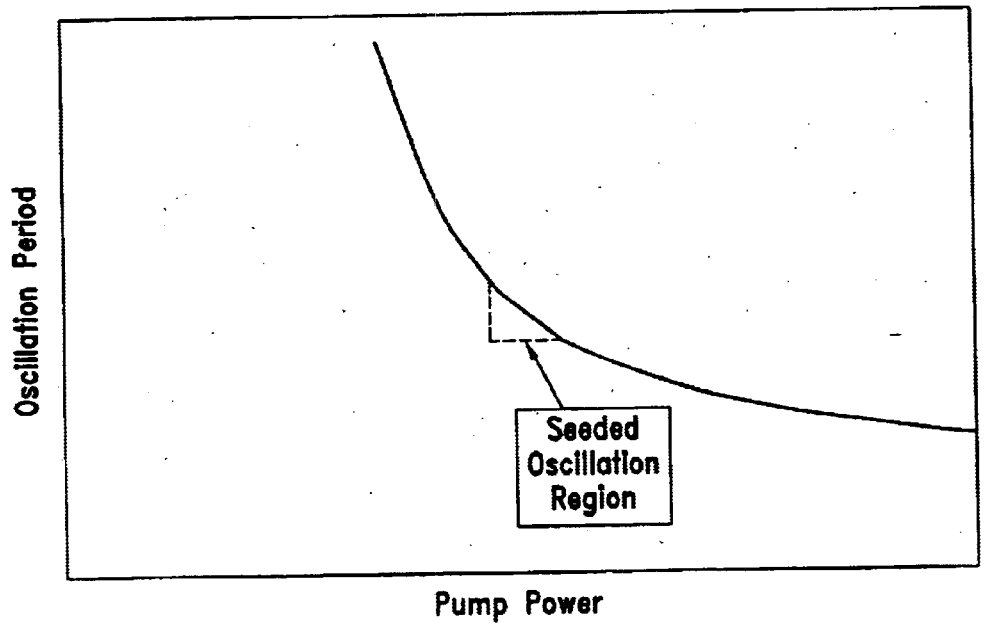
FIG. 2 is a graph of pump power vs. oscillation period indicating the seeded oscillation region.

Referring now to FIG. 2, the relationship between the pump power to the laser and the relaxation oscillation period can be seen. In the absence of seed pulses inducing locking of the relaxation oscillator, the oscillation period decreases with increasing pump power. In the region where the relaxation oscillation period is locked, due to the seeding of the laser cavity, the relaxation oscillation period remains at a constant value over a small range of pump power, as shown by the dashed lines. The function of the controller 26 is to identify this discontinuity in the relationship between the pump power and the oscillation period, hence determining the period of the locked oscillation and therefore the roundtrip time of flight of the optical pulse to the downrange target. There are multiple methods for determining the presence of the discontinuity discussed above. For example, the controller may gradually increase the pump power from an initial low power to a high power while it simultaneously measures the relaxation oscillation period. The controller may mathematically identify the discontinuities in the relationship of the oscillation period to the pump power.

Figure 3A:
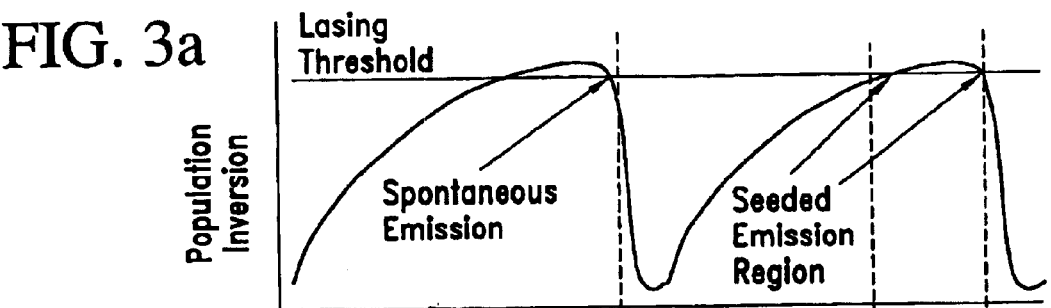
FIGS. 3a–3c are three graphs relating to the instance where the pump power is too low for seeded osdllation.

Referring to FIG. 3a, a low pump power causes a slow rise in the population inversion until the population inversion exceeds the lasing threshold, defined as the point when the overall gain of the cavity exceeds unity. A further rise in the population inversion monotonically increases the cavity gain up to the point when a pulse is spontaneously emitted from the cavity. A seed pulse is injected into the cavity during the time that the population inversion is above threshold, but before the occurrence of a spontaneous emission pulse will induce a subsequent pulse from the cavity. This period of time identified in FIG. 3a as the "Seeded Emission Region" performs the function of range gating any return pulses injected into the cavity. The distance from the laser rangefinding apparatus 10 to the reflecting target 28 must lie within the narrow distance range such that the time of flight of a transmitted pulse result in its reception and injection into the laser cavity during the seeded emission region period.

Figure 3B:
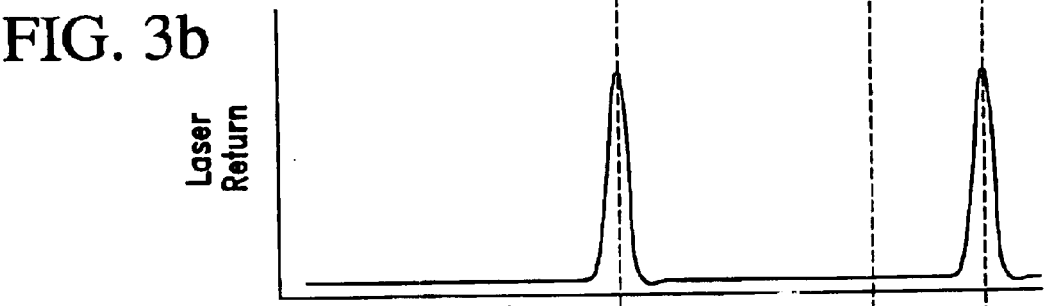

FIG. 3b shows the optical output as the cavity spontaneously emits a pulse and extracts energy from the population inversion. As the pump power again increases the population inversion, the first spontaneous pulse is reflected from the downrange target and this seed pulse is injected Into the laser cavity.

Figure 3C:
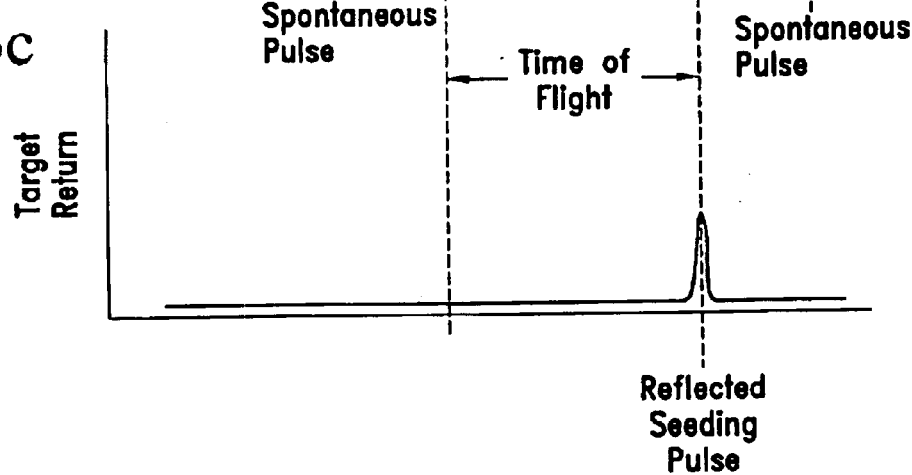

FIG. 3c shows that the time of flight of this pulse is shorter than the population inversion build up time required for the laser cavity to reach lasing threshold. The seed pulse is therefore unable to induce the subsequent output pulse from the cavity. This condition indicates that the distance to the reflecting target is too short to produce locked oscillations at the selected pump power.

Figure 4A:
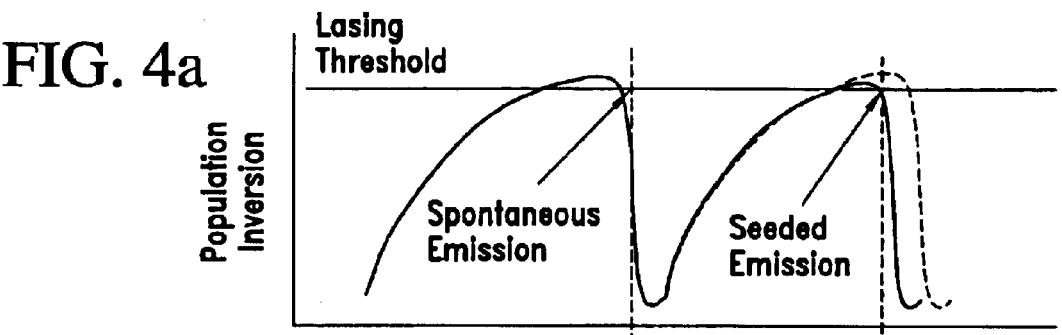
FIGS. 4a–4c are three graphs relating to the instance where the pump power is correct for seeded oscillation.
Figure 4B:
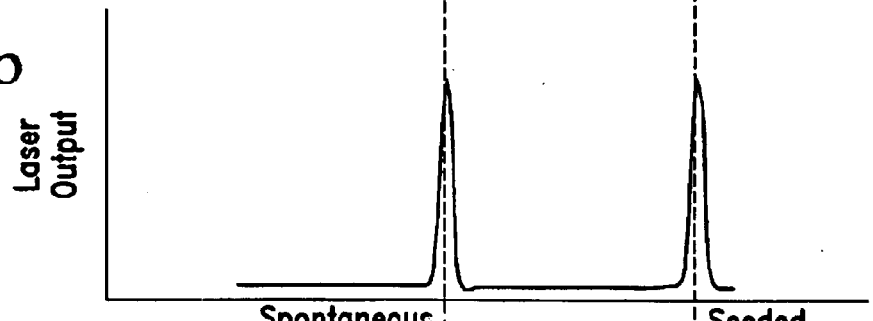
Figure 4C:
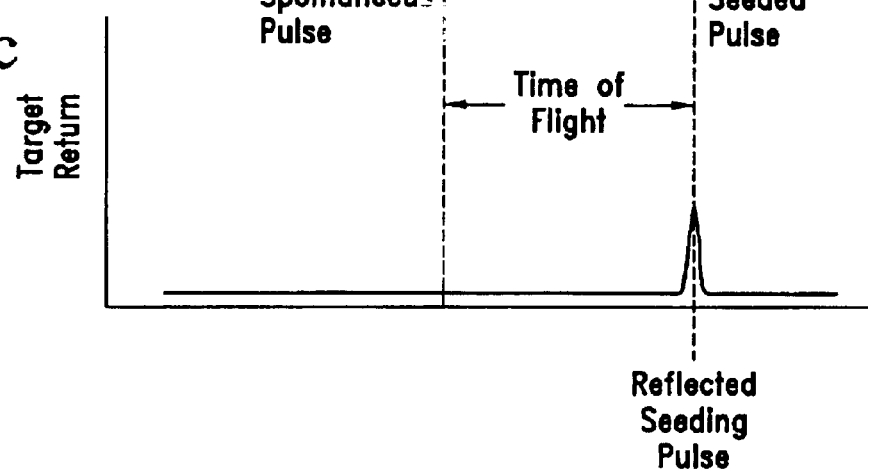

FIG. 4a shows the operation of the relaxation oscillation when the pump power is adjusted to allow locked oscillation. Again, a spontaneous pulse is emitted from the laser cavity. The return seed pulse is injected into the cavity at a time when the population inversion is greater than threshold, but before the spontaneous build up time of the cavity shown by dashed lines. The timing of the seed pulse is seen in FIG. 4c. The timing of the seeded output from the cavity matches the injected seed pulse as shown in FIG. 4b. This cyde is repeated for subsequent locked pulses.

Figure 5A:
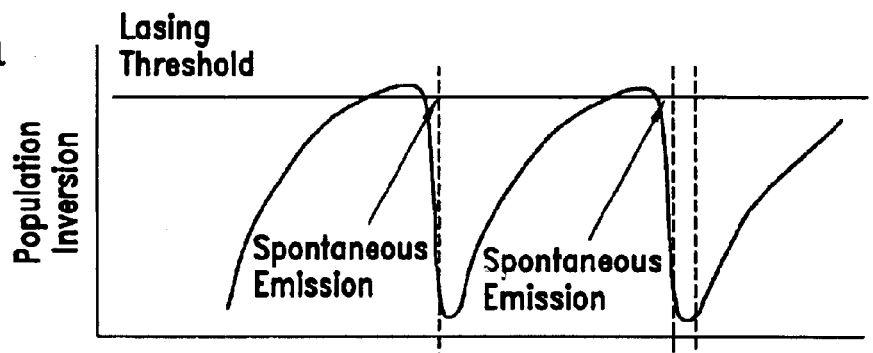
FIGS. 5a–5c are three graphs relating to the instance where the pump power is too high for seeded oscillation.
Figure 5B:
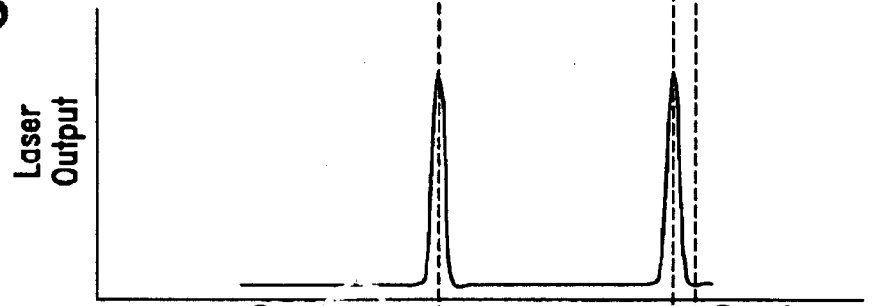
Figure 5C:
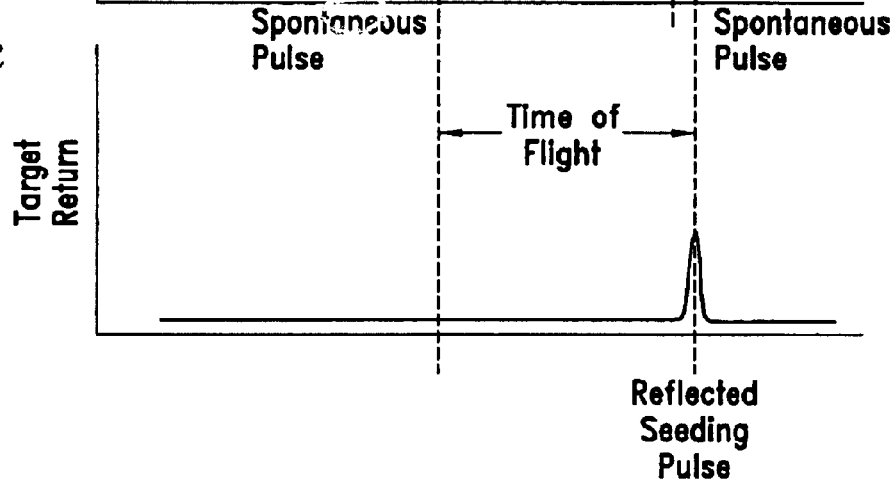

Finally, FIG. 5a shows the operation of the relaxation oscillation when the pump power is too high for locked oscillation. The seed pulse, resulting from the first spontaneous pulse, as shown in FIG. 5c, is injected into the cavity after the cavity has generated the subsequent spontaneous pulse shown in FIG. 5b. Since the population inversion is below lasing threshold at the time the seed pulse is injected, the seed pulse does not induce a subsequent output pulse from the cavity. This condition indicates that the distance to the reflecting target is too long to produce locked oscillations at the selected pump power.

Obviously, many modifications and variations of the present invention are possible in light of the above teachings. It is, therefore, to be understood that within the scope of the appended claims, the Invention may be practiced otherwise than as specifically described.

What is claimed and desired to be secured by Letters Patent of the United States is:

What is claimed is:

1. A laser range finding apparatus, comprising:
   a) an optical relaxation oscillator assembly for producing relaxation oscillations, said relaxation oscillations being a series of optical pulses having a controllable repetition rate;
   b) an outcoupling optics for receiving said series of optical pulses and redirecting a minor portion of the energy of said series of optical pulses, a major portion of the energy of said series of optical pulses being adjusted in accordance with first desired beam propagation parameters;
   c) a photodetector for receiving said minor portion and converting said minor portion to an electrical signal representative of said series of optical pulses; and,
   d) a controller for receiving said electrical signal and determining the repetition period between said optical pulses, said controller providing a controller output to said optical relaxation oscillator assembly for adjusting said controllable repetition rate of said series of optical pulses produced by said optical relaxation oscillator assembly, wherein during operation said major portion of said energy of said series of optical pulses is directed to a reflecting target, reflected therefrom, collected by said outcoupling optics and directed back to said optical relaxation oscillator assembly to stimulate subsequent relaxation oscillations, thus locking the period of said relaxation oscillations to the time of flight of the roundtrip path between the laser finding apparatus and the reflecting target.

2. The laser range finding apparatus of claim 1, wherein said optical relaxation oscillator assembly, comprises:
   a) a power source; and,
   b) a laser gain cavity operably associated with said power source for producing said relaxation oscillations.

3. The laser range finding apparatus of claim 1, wherein said optical relaxation oscillator assembly, comprises:
   a) a controllable power source for pumping a gain medium of said optical relaxation oscillator assembly, providing a means for controlling a timing profile of a population inversion within said gain medium; and,
   b) a laser gain cavity operably associated with said power source for producing said relaxation oscillations, said laser gain cavity operating in a perturbed mode to induce relaxation oscillations at a repetition rate influenced by said power source.

4. The laser range finding apparatus of claim 1, wherein said outcoupling optics allows for the injection of photons to induce said relaxation osdllations.

5. The laser range finding apparatus of claim 1, wherein said outcoupling optics, comprises:
   a) a beamsplitter for said redirecting of said minor portion; and,
   b) beam directing optics for providing said adjustment of said major portion.

6. The laser range finding apparatus of claim 1, wherein said controller comprises means for determining when said repetition period results from said locking.

7. The laser range finding apparatus of claim 1, wherein said controller comprises means for determining when said repetition period results from said locking, by identifying a discontinuity in the relationship between pump power and the oscillation period, said discontinuity being defined by a oscillation period of substantially constant value over a small range of pump power.

8. The laser range finding apparatus of claim 1, wherein said controller comprises means for measuring said repetition period.

9. The laser range finding apparatus of claim 1, wherein said optical relaxation oscillator assembly, comprises:
   a) a power source, said power source comprising a controllable electric source; and,
   b) a laser gain cavity operably associated with said power source for producing said relaxation oscillations.

10. The laser range finding apparatus of claim 1, wherein said optical relaxation oscillator assembly, comprises:
    a) a power source, said power source comprising an optical source; and,
    b) a laser gain cavity operably associated with said power source for producing said relaxation oscillations.

11. The laser range finding apparatus of claim 1, wherein said optical relaxation oscillator assembly, comprises:
    a) a power source, said power source comprising an optical source; and,
    b) a laser gain cavity operably associated with said power source for producing said relaxation oscillations.

12. The laser range finding apparatus of claim 1, wherein said optical relaxation oscillator assembly, comprises:
    a) a power source, said power source comprising a radio frequency (rf) source; and,
    b) a laser gain cavity operably associated with said power source for producing said relaxation oscillations.

13. A method for finding the range of a reflecting target, comprising the steps of:
    a) producing relaxation oscillations, said relaxation oscillations being a series of optical pulses at a controllable repetition rate;
    b) receiving said series of optical pulses and redirecting a minor portion of the energy of said series of optical pulses, a major portion of the energy of said series of optical pulses being adjusted in accordance with first desired beam propagation parameters and being directed to a reflecting target, said optical pulses being reflected therefrom;
    c) receiving said minor portion and converting said minor portion to an electrical signal representative of said series of optical pulses;
    d) receiving said electrical signal, determining the repetition period between said optical pulses and adjusting said controllable repetition rate of said series of optical pulses;
    e) collecting said reflected optical pulses to stimulate subsequent relaxation oscillations;
    f) locking the period of said relaxation oscillations to the time of flight of the roundtrip path between the laser finding apparatus and the reflecting target; and,
    g) analyzing the relationship between pump power and the relaxation oscillation period for determining a period of locked oscillation, thus determining the time of flight of the roundtrip
    path between the laser finding apparatus and the reflecting target.

14. The method of claim 13, wherein said step of producing relaxation oscillations, comprises the steps of:
    a) providing a power source; and
    b) providing a laser gain cavity operably associated with said power source for producing said relaxation oscillations.

15. The method of claim 13, wherein said step of producing relaxation oscillations, comprises:
    pumping a gain medium of an optical relaxation oscillator assembly and controlling a timing
    profile of a population inversion within said gain medium.

16. The method of claim 13, wherein said step of collecting said reflected optical pulses comprises the step of injecting photons to induce said subsequent relaxation oscillations.

17. The method of claim 13, wherein said step of analyzing said relationship comprises identifying a discontinuity in the relationship between pump power and the oscillation period, said discontinuity being defined by a oscillation period of substantially constant value over a small range of pump power.

18. A laser range finding apparatus, comprising:
    a) an optical relaxation oscillator assembly for producing relaxation oscillations, said relaxation oscillations being a series of optical pulses having a controllable repetition rate, said optical relaxation oscillator, comprising:
       a. a power source; and,
       b. a laser gain cavity operably associated with said power source for producing said relaxation oscillations;
    b) an outcoupling optics for receiving said series of optical pulses and redirecting a minor portion of the energy of said series of optical pulses, a major portion of the energy of said series of optical pulses being adjusted in accordance with first desired beam propagation parameters;
    c) a photodetector for receiving said minor portion and converting said minor portion to an electrical signal representative of said series of optical pulses; and,
    d) a controller for receiving said electrical signal and determining the repetition period between said optical pulses, said controller providing a controller output to said optical relaxation oscillator assembly for adjusting said controllable repetition rate of said series of optical pulse produce said optical relaxation oscillator assembly,
    wherein during operation said major portion of said energy of said series of optical pulses is directed to a reflecting target, reflected therefrom, collected by said outcoupling optics, and directed back to said optical relaxation oscillator assembly to stimulate subsequent relaxation oscillations, thus locking the period of said relaxation oscillations to the time of flight of the roundtrip path between the laser finding apparatus and the reflecting target, said controlling determining when said repetition period results from said locking, by identifying a discontinuity in the relationship between pump power and the oscillation period, said discontinuity being defined by an oscillation period having a substantially constant value over a small range of pump power.

* * * * *

UNITED STATES PATENT AND TRADEMARK OFFICE
CERTIFICATE OF CORRECTION

PATENT NO.    : 6,781,677 B1
DATED         : August 24, 2004
INVENTOR(S)   : Steven E. Muenter and Blair F. Campbell It is certified that error appears in the above-identified patent and that said Letters Patent is hereby corrected as shown below:

Title page,
Item [57], ABSTRACT,
Lines 1-14, delete
"FIG 1 of the drawings has been amended to include arrows 12a and 12b. The word "laser", the arrow symbol underneath the word laser" and the partial sinusoidal symbol adjacent the word "laser" have all been deleted. In addition, the word "photodetector" deleted and a dashed line circumscribing the photodetector componants has been added along with reference numeral 25. Reference numeral 24 has been added to denote the photodiode. Finally, the photodiode symbol associated with oscillator apparatus 12 has been changed to simply indicate a "Gain Cavity" box. The attached "Replacement Sheet(s)" of drawings include changes to FIG. 1. The attached "Replacement Sheet(s)," which include(s) FIG(S.) 1 and 2, replace the original sheet(s) including FIG(S.) 1 and 2." and insert:
-- The laser range finding apparatus includes an optical relaxation oscillator assembly, an outcoupling optics, a photodetector and a controller. The optical relaxation oscillator assembly produces relaxation oscillations. The relaxation oscillations are a series of optical pulses having a controllable repetition rate. The outcoupling optics receives the series of optical pulses and redirects a minor portion of the energy of the series of optical pulses. A major portion of the energy of the series of optical pulses is adjusted in accordance with first desired beam propagation parameters. A photodetector receives the minor portion and converts the minor portion to an electricl signal representatice of the series of optical pulses. A controller receives the elctrical signal and determines the repetition period between the optical pulses. The controller provides a controller output to the optical relaxation oscillator assembly for adjusting the controllable repetition rate of the series of optical pulses produced by the optical relaxation oscillator assembly. During operation, the major portion of the energy of the series of optical pulses is directed to a reflecting target, reflected therefrom, collected by the outcoupling optics, and directed back to the optical relaxation oscillator assembly to stimulate subsequent relaxation oscillator, thus locking the period of the relaxations oscillations to the time of fight of the roundtrip path between the laser finding apparatus and the reflecting target. --.

Column 1,
Line 40, "photomuluplier" should be -- photomultiplier --.

Column 3,
Line 67, "osdllation" should read -- oscillation --.

UNITED STATES PATENT AND TRADEMARK OFFICE
CERTIFICATE OF CORRECTION

PATENT NO. : 6,781,677 B1
DATED : August 24, 2004
INVENTOR(S) : Steven E. Muenter and Blair F. Campbell It is certified that error appears in the above-identified patent and that said Letters Patent is hereby corrected as shown below:

Column 4,
Lines 45-46, "beamsp-lilter" should be -- beamsplitter --.
Line 53, "subsystem 25" should be -- subsystem 23 --.
Line 61, after "output" insert -- 26a --.

Column 5,
Line 66, "cyde" should be -- cycle --.

Column 6,
Line 1, "relaxatior" should be -- relaxation --.

Column 7,
Line 3, "osdllations" should be -- oscillations --.

Signed and Sealed this

Twenty-fourth Day of January, 2006

JON W. DUDAS
*Director of the United States Patent and Trademark Office*